United States Patent [19]

DiStefano

[11] 4,082,889

[45] Apr. 4, 1978

[54] LUMINESCENT MATERIAL, LUMINESCENT THIN FILM THEREFROM, AND OPTICAL DISPLAY DEVICE THEREWITH

[75] Inventor: Thomas Herman DiStefano, Tarrytown, N.Y.

[73] Assignee: International Business Machines Corporation, Armonk, N.Y.

[21] Appl. No.: 652,962

[22] Filed: Jan. 28, 1976

[51] Int. Cl.$^2$ .............................................. B32B 5/16
[52] U.S. Cl. ...................................... 428/328; 427/64; 427/68; 427/71; 427/85; 427/215; 428/403; 428/539
[58] Field of Search ............... 428/323, 328, 403, 539; 427/64, 68, 71, 85, 215

[56] References Cited

U.S. PATENT DOCUMENTS 3,898,509    8/1975    Brown ...................................... 427/71

Primary Examiner—Marion E. McCamish
Attorney, Agent, or Firm—Bernard N. Wiener

[57] ABSTRACT

This disclosure provides a polycrystalline semiconductor material which has a high luminous efficiency because of an especial profile of impurity concentration within each grain thereof. The regions immediately adjacent to the grain surfaces or grain boundaries are preferentially and selectively doped with impurity atoms to achieve a relatively high concentration of majority carriers of the same conductivity type as is in the grain center. As a result of the noted doping profile in the material, minority carriers which are excited within each grain by externally originated radiation are confined to the central portion of the grain where they emit electromagnetic radiation by efficient luminescent recombination. The material of this disclosure in polycrystalline thin film form obtains a high resolution screen for an electron beam optical display device.

32 Claims, 10 Drawing Figures

LUMINESCENT MATERIAL, LUMINESCENT THIN FILM THEREFROM, AND OPTICAL DISPLAY DEVICE THEREWITH

BACKGROUND OF THE INVENTION

Luminescent layers of material have commonly been used in various applications including fluorescent lighting tubes, cathode ray tubes, x-ray radiographic machines, and solid state electroluminescent panels. In each of these applications excess electrons or holes are produced by a source which is external to the luminescent layer. Photons of electromagnetic radiation, e.g., visible light, are than produced within the layer when electrons and holes recombine within the film. However, electrons and holes may also recombine at various defects within the layer without producing photons, resulting in a decrease of the luminescent efficiency.

In the fluorescent lighting tube, electrons and holes are excited within the luminescent layer by ultraviolet radiation generated within the tube. In the cathode ray tube, the luminescent layer is excited by a high energy incident electron beam. In the case of the x-ray radiographic apparatus, the luminescent layer is excited by a beam of incident x-rays. In the case of solid state electroluminescent devices, electrons or holes are produced within the luminescent layer by carrier injection from an electrode. In each case the luminescence efficiency depends upon the relative importance of recombination by emission of a photon and recombination at a crystalline defect without the emission of a photon.

Recombination without the emission of photons, e.g., light, or non-radiative recombination, occurs primarily on crystallographic defects in each of the crystallites of the luminescent layer. These crystalline defects, including grain boundaries, stacking faults, crystalline twins, dislocations, lattice vacancies, and deleterious impurity ions, are largely concentrated around the boundaries of each of the grains of the crystallite comprising the luminescent layer. In order to obtain a high efficiency from such a luminescent layer it is necessary that the defect containing material around the outside of each grain of the luminescent layer comprise a small portion of the total volume of the respective grain. This is achieved in the prior art by using grains or crystallites which are large relative to the electron diffusion length in the fabrication of the luminescent layer. Thus, minority carriers within a given grain have a higher probability for luminescent recombination within the grain then for non-radiative recombination in the defective region near the boundary of the grain.

In order to obtain a high efficiency of luminescence the grain comprising a luminescent layer of the various applications of the prior art are large relative to the charge carrier diffusion lengths therein. In a luminescent layer of the prior art, comprising materials such as zinc oxide, cadmium sulfide, or zinc sulfide, typical grain sizes range from about 100 microns to over 1,000 microns, in order to obtain high efficiencies.

In typical application, grains of these luminescent materials are applied to the surface an insulating substrate, such as glass, by means of a liquid vehicle. The liquid is allowed to evaporate after the suspension of luminescent grains within the liquid is applied to the supporting substrate. The individual grains of luminescent material are fused together and activated by a process of calcining, in which the layer of material is heated to a temperature of about 400° to 600° centigrade for several minutes in an atmosphere which may contain a chemically reducing gas mixture. The resulting luminescent layer is a loose aggregate of individual grains of luminescent material, each of which is from about 100 microns to over 1,000 microns across. Because of the large grain size the luminescent layer is translucent in appearance, and reflects light by the diffused scattering of incident photons. Additionally, in order to increase the efficiency of luminescent layers comprising zinc oxide, cadmium sulfide, or zinc sulfide, impurity dopants such as copper, manganese, iron and other metals are added to these materials in order to introduce active sites at which radiative recombination occurs efficiently. However, even with the addition of these luminescence enhancing dopants, it is necessary to use relatively large crystallites of material in order to achieve a high luminescent efficiency.

Several different advantages are inherent in the nature of luminescent layers of the prior art. It has been difficult to achieve a resolution which is better than several times the size of the larger grains comprising the luminescent layer of the prior art. One reason for this low resolution is that electrons or holes which are excited within one grain may produce light by recombination at any other point of that grain. Another reason for the low resolution of the prior art is the fact that light produced within the luminescent layer maybe scattered several times within the layer because of the loose agglomeration of the adjacent large grains comprising the layer. Taken together, the deficiencies of the luminescent layers of the prior art limit the resolution of high efficiency cathode ray tubes, x-ray radiographic apparatus, nuclear particle detectors, and various electroluminescent display schemes.

Another limitation of the luminescent layers of the prior art is the relatively high electrical resistance thereof. This is a result of the physical structure comprising the agglomeration of grains within the layer, and the large band gap materials comprising each of the grains.

Another limitation of the luminescent layers of the prior art is the very low relative efficiency of small grain polycrystalline thin films of luminescent materials because of the recombination of excess electrons or holes excited within the thin film at the grain boundaries contained therein. The prior art does not teach a technology for effectively eliminating the deleterious effect of minority carrier recombination at grain boundaries or surfaces.

OBJECTS OF THE INVENTION

It is an object of this invention to increase the fluorescent efficiency in a polycrystalline thin film semiconducting material.

It is another object of this invention to increase the luminescent efficiency of a thin polycrystalline semiconductor material used as the fluorescent screen of an electron beam tube.

It is another object of this invention to provide a high resolution, high efficiency phosphorescent screen for an electron beam tube by the utilization of a thin film of polycrystalline semiconducting material whose grain boundary regions have been selectively doped with impurities.

It is another object of this invention to provide a high resolution, high efficiency electron beam tube which incorporates a phosphorescent screen comprising a thin film of gallium phosphide polycrystalline material with a high concentration of majority-type dopant in the region near to the grain boundaries.

It is another object of this invention to increase the luminous efficiency of a thin film of polycrystalline semiconducting material by heavily and selectively doping the grain boundary region with a majority-type dopant impurity.

It is another object of this invention to increase the luminescent efficiency of a thin film of polycrystalline semiconducting material by doping the grain boundary regions thereof with a majority-type dopant introduced by a sequence of first a low temperature and second a high temperature diffusion process.

It is another object of this invention to increase the luminescent efficiency of a polycrystalline film of n-type gallium phosphide material by heavily doping the grain boundaries thereof with a sulphur dopant impurity which has been introduced selectively by a sequence of processes involving involving first a low temperature diffusion step and second a high temperature diffusion step.

SUMMARY OF THE INVENTION

This invention provides a polycrystalline semiconductor material which has a high luminous efficiency because of an especial profile of impurity concentration within each grain thereof. The regions immediately adjacent to the grain surfaces or grain boundaries are preferentially and selectively doped with impurity atoms to achieve a relatively high concentration of majority carriers of the same conductivity type as is in the grain center. As a result of the noted doping profile in the material, minority carriers which are excited within each grain by externally originated radiation are confined to the central portion of the grain where they emit electromagnetic radiation by efficient luminescent recombination. The material of this invention in polycrystalline thin film form obtains a high resolution screen for an electron beam optical display device.

A luminescent thin film in accordance with the principles of this invention comprises a thin film of polycrystalline semiconductor luminescent material on an insulating or semi-insulating substrate. The semiconducting film is of one conductive type, corresponding to the majority carrier type. The region of each grain in the vicinity of the grain surface or grain boundaries is more heavily doped with the majority-type dopant than is the interior volume of that grain. The preferential heavy doping density in a small but finite thickness skin or envelope enclosing each grain results in a thin region of high majority carrier density around each grain. The electron energy band and the associated electric field lines and equipotential contour lines are distorted by the thin skin of high majority carrier density around each grain.

A result of the dispersion of the electron potential is that the minority carriers, which may be excited within each grain, are witheld from the region near the grain boundary and thus are effectively confined within the central portion of each grain. Further, minority carriers produced by excitation such as an electron beam, X-rays, ultra-violet light, or other radiation, are confined to the central portion of that particular grain of semiconducting material in which they were produced, until they recombine with majority carriers in that central portion of the grain.

Since the density of crystalline defects and the associated nonradiative recombination centers is low in the central portion of each grain, the efficiency of luminescence of this configuration with highly doped regions near the grain boundaries of each grain is greatly enhanced.

The luminescent layer, in accordance with the teachings of this invention, is a thin polycrystalline film of semiconducting material. The individual grains, or crystallites, of the semiconducting material may be of any orientation and configuration. The size of each grain may be considerably less than the diffusion length for minority carriers in a bulk piece of the semiconductor material, and yet benefit from the improvements in efficiency resulting from the teachings of this invention. The semiconducting layer itself is in contact with an insulating or a semi-insulating substrate. A thin but finite layer of heavily majority doped semiconductor material surrounds the grain boundary or grain surface region of each grain of the layer. As a direct result of the thin skin of heavily doped material on each grain, the efficiency of luminescene, when excited by radiation of various types, is greatly enhanced for the overall luminescent layer.

The grain boundary regions within a polycrystalline semiconducting film may be preferentially and heavily doped by any of several methods. A dopant impurity of the majority type can be diffused preferentially and selectively into the grain boundaries and grain surfaces of a polycrystalline semiconductor film if the diffusion process is accomplished at a low temperature. At sufficiently low temperatures, grain boundary diffusion is much more rapid than diffusion within the bulk of the material, with the result that the dopant impurity atoms cover only the grain boundary and grain surface regions after the relatively low temperature diffusion step. Next, the impurity dopant atoms are diffused a small but finite distance into the body of each grain by a second, relatively high temperature diffusion step. As a result of this two-temperature, two-step diffusion process, the grain boundaries and the regions surrounding them are preferentially and heavily doped with majority-type dopant. A second means of selectively doping the regions around the grain boundaries of a semiconductor polycrystalline film involves a first step of preferentially etching the grain boundary region and a second step of filling the etched portions of the material with a heavily doped thin film of semiconductor of the same type. The etching and deposition of the semiconductor can be accomplished by a gas phase procedure or by a liquid phase procedure. The result is a polycrystalline semiconductor film with the grain boundary and grain surface regions therein heavily and preferentially doped with majority-type dopant.

Thus, practice of this invention provides a polycrystalline semiconductor material comprising individual grains each one of which contains an impurity or impurities arranged especially such that they dope the grain to provide majority carriers of a given density distribution, said grains of semiconductor material containing dopant producing charge carriers of substantially one conductivity type, said density of majority carriers being substantially higher in the immediate, finite region near the grain surface than in the region near the center of the grain, and said grains being of average size smaller than the minority carrier diffusion length in bulk semiconductor material of the same type and doping density as the material in the center of the grain.

Illustratively, the following are characteristics of the material: the grain size is between about 1 and 100 microns in average cross section dimension; the doping majority carrier density in the region of the grain boundaries is more than one order of magnitude larger than the majority carrier density in the region of the grain center; and each grain is physically separate from the other grains thereof, the material comprising essentially a powder of individual grains.

Further, said grains are aggregated into a film with a relatively high luminescent efficiency when excited by ionizing radiation. As one alternative arrangement, said grains are arranged contiguously to comprise a polycrystalline thin film such that the grains are bounded either by an adjacent grain of approximately the same physical characteristics, or by the top or bottom surface of said film so that said film is electrically conductive, and in particular said grains comprise a material chosen from the group consisting of GaAs, GaP, AlAs, InP AlN, and GaN, or from the group comprising alloys of any two of the materials of said group. As another alternative arrangement, said grains are arranged non-contiguously in such a way that each grain contacts the grains adjacent to itself by a small portion of the grain surface, said grains comprising a loose aggregate bound together by an inactive agent to form a mechanically and chemically stable film, and in particular said grains comprise a material chosen from the group consisting of CdS, ZnO, ZnS, GaN, and AlN.

A feature of this invention is that said semiconductor material comprises a material with a direct band gap, said material being chosen from the class including the direct band gap III-V and II-VI materials and alloys thereof. In particular, said III-V material are GaP, AlN, $Ga_xAl_{I-x}As$ and the II-VI materials are CdS and ZnS. When said semiconductor material is N-type doped $Ga_xAl_{I-x}As$, the grain size thereof is in the range from about 1 to about 10 microns, the doping density for the central portion thereof is approximately $10^{17}/cm^3$, and the doping density for the region near the grain boundary thereof is approximately $10^{19}/cm^3$, and the impurity dopant thereof is chosen from the group consisting of S, Se, and Te. When said semiconductor material is GaP of substantially n-type conductivity, said grain size is in the range from about one to about 10 microns, said especial doping density profile comprises a uniform background density of sulfur at a density of about $10^{16}$ atoms/$cm^3$ and an additional amount of sulfur doping density reaching a maximum density of about $10^{18}$ atoms/$cm^3$, and said polycrystalline film has a thickness of between one micron and 20 microns.

Accordingly, in accordance with the principles of this invention a method is provided for fabricating a polycrystalline film with a high luminous efficiency by preferentially and heavily doping the region of material near the surface of each grain with a dopant of the same conductivity type as that of the substantial body of the grain through a first low temperature diffusion of doping material into the grain boundaries of said film, and a second high temperature annealing of the film in which the grain boundaries have been doped. Said preferential doping of the region near the grain boundary is accomplished by: diffusing the dopant into the film at a sufficiently low temperature that grain boundary diffusion is dominant, and annealing said film at a temperature above that at which grain boundary diffusion is substantially dominant. In greater detail, said low temperature diffusing is accomplished at a temperature approximately between 100° C and 400° C, and said high temperature diffusing is accomplished at a temperature approximately between 800° C and 1200° C. The teachings of this invention are applied specifically to the phosphorescent layer of an electron beam tube, in order to improve the resolution and efficiency of said layer. Illustratively, the phosphorescent layer of the electron beam tube comprises a polycrystalline film of n-type gallium phosphide which incorporates a given amount of nitrogen impurity. The thin film of gallium phosphide is deposited directly on the glass face plate of the electron beam tube. A sulfur impurity is incorporated into the grain boundaries of the polycrystalline film by exposing the film to sulfur vapor at a relatively low temperature. Subsequently, the film is heated to a somewhat higher temperature in order that the sulfur diffuse into each grain of the polycrystalline film and to produce a thin skin of heavily n-type material around each grain. The luminescent gallium phosphide thin film is incorporated into an electron beam tube, in which an electron beam is used to excite the gallium phosphide film and to produce efficent luminescence.

PRACTICE OF THE INVENTION

The practice of this invention will now be described in terms of the material structure, the method of fabrication, and its application in display and other devices. The luminescent layer as practiced in this invention comprises a polycrystalline thin film of semiconductor material substantially of one doping type. The structure of the film is such that the component crystallites are arranged at random, and have various sizes which are generally smaller than the diffusion length for minority carriers in the bulk material of the semiconductor itself.

As normally practiced, the luminescent thin film of this invention is supported by an insulating or a semi-insulating substrate. Throughout the substantial portion of the film, no ohmic contacts or Schottky-barrier contacts or p-n junctions contact the film, although electrical contact may be made to the film at a point or points around the edge of the film itself. In its useful application, the luminescent thin film of this invention is incorporated into a device along with an external means, such as electron beam, X-rays, ultra-violet radiation, or other radiation, for exciting electron hole pairs in the body of the film. The luminescent film converts radiation of the various forms mentioned hereinbefore into photons of visible or near visible light. This resultant light is the total net output of the luminescent thin film of this invention.

It is a desirable feature of the luminescent thin film described herein for the practice of this invention that the grain boundary regions thereof are more heavily doped than the region of the grain center, and that the dopant of the region near the grain boundary be of the same conductivity type as the dopant near the region of the grain center. Dopant atoms are introduced selectively into the regions near to the grain boundaries by any one of several methods, including: a two-step diffusion process discovered for the practice of invention of first a low temperature step and then a high temperature step; a selective chemical etching of the region near the grain boundary followed by a deposition of heavily doped material of the same type as discovered for the practice of this invention; or any other method which may be used to selectively dope semiconductor materials near the region of the grain boundary.

As a result of the doping profile within each grain, the electron energy bands and the related equipotential lines are distorted in such a way that minority carriers within each grain are repelled from the region of the grain boundary. That is, minority carriers produced within any particular grain of the film by incident radiation are trapped within the central portion of that grain. Since the minority carriers are unable to reach the grain boundary regions, which are sites of a high density of recombination centers associated with various types of crystalline defects, the lifetime of the minority carrier is increased and its chance of undergoing a radiative recombination is correspondingly increased. Further, the minority carrier will recombine within the grain in which it was produced, because it is confined by the equipotential lines to the central portion of that grain. Thus, it can be seen that, by virtue of the selectively doped grain boundary regions, as provided in accordance with the principles of this invention, both the efficiency and the resolution of the polycrystalline semiconductor thin film are enhanced over that of an untreated film as provided through the prior art alone.

The polycrystalline luminescent thin film as practiced by this invention is represented in FIGS. 2A and 2B, which show a cross-sectional sketch of the physical film and the electron energy diagram which characterizes the semiconducting film, respectively. The cross-sectional sketch 30 of the physical structure of the luminescent film of this application comprises a polycrystalline semiconductor film 40 on an insulating or a semi-insulating substrate 32. The polycrystalline film itself comprises individual grains 36 oriented with random size, orientation, and configuration. Each grain may be bounded by a grain boundary 38, the film surface 34, or the interface 42 between the film and the substrate. The typical size of each grain 36 ranges from about 1 micron to about 100 microns. The semiconductor film is conductive in the lateral direction. However, no electrical contact, ohmic contact, Schottky barriers, or p-n junctions are made through most of the area on the surface of the semiconductor film.

The advantage in efficiency of the thin film semiconductor 40 as provided for and practiced by this invention results from the thin layer 35 of heavy impurity doping of the majority type which is formed near the surface of each grain. This layer forms a skin which preferably covers all surfaces, whether they be the film surface 34, a grain boundary 38, or the interface 42 between the film 40 and the substrate 32.

To facilitate the understanding of the advantages of this invention, the majority type dopant of the material of the polycrystalline semiconductor film 34 was chosen to be n-type, so that the thin skin of highly doped semiconductor material 35 is considered to have a much higher density of electrons than the material 36 of the central portion of the grain. This thin skin 35 of n-type material can be introduced by any one of several selective doping schemes which will be described hereinafter.

The electron energy bands of the polycrystalline semiconductor film treated in accordance with the principles of this invention are shown schematically in FIG. 2B. The high density of majority carrier electrons 46 in the region surrounding each grain boundary causes a dip in the electron energy band in a finite region around the grain boundary. The total amplitude of this dip may be on the order of 0.05 electron-volts to 0.5 electron-volts, depending upon the type of semiconductor material 36 and the relative doping level in the central grain portion 36 with respect to the heavily doped thin skin portion 35.

As a result of the distortion of the electron energy band in the semiconductor material, the minority carrier holes 44 are repelled from the region of material surrounding the grain boundaries 38. Even at room temperature, the thermal energy of an average hole is insufficient to overcome the potential barrier found in the region of the grain boundary. A potential barrier of only 0.05 electron-volts is sufficient to repel all but the most energetic holes 44 from the region surrounding the grain boundary for a semiconductor material 40 which is at temperature near to room temperature. As a result, excess holes 44 produced by incident radiation 41 and 41-1 are confined to the central portion of the grain in which they were created. A very small portion of the holes 44 is able to reach the grain boundary where a high density of recombination centers 45 allows the holes to recombine without the emission of light.

BRIEF DESCRIPTION OF THE DRAWING

The FIG. 1A illustrates the prior art in polycrystalline luminescent thin films by a cross sectional sketch representing a polycrystalline semiconducting film on an insulating substrate, which when excited by incident electrons, photons, or other radiation responds by emitting photons of light.

PRIOR ART TO THE INVENTION

Figure 1A:
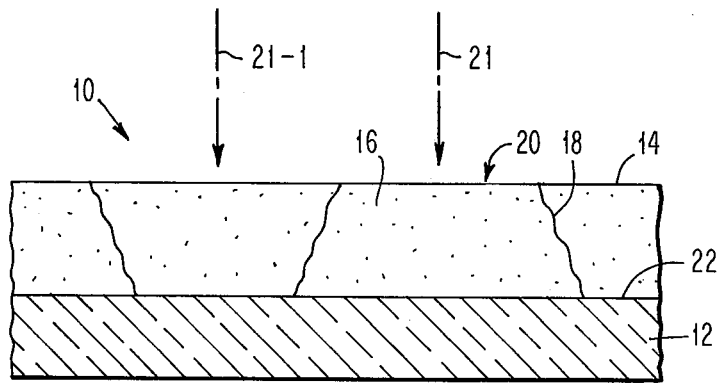
FIG. 1B represents the electron energy bands in the semiconducting luminescent thin film of the prior art. The doping level and electron energy are shown as uniform throughout, although random fluctuations of the doping level at any point may cause some variation of the electron bands.
Figure 1B:
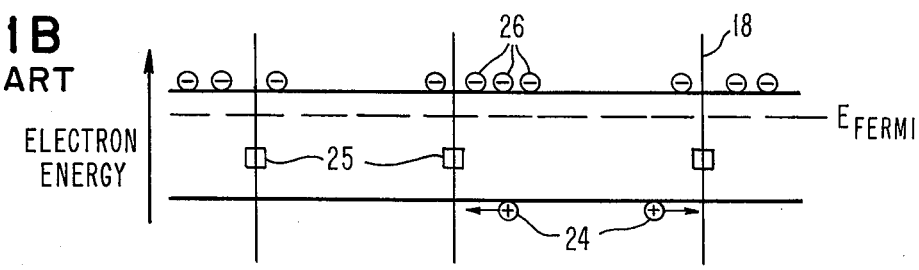
Figure 2A:
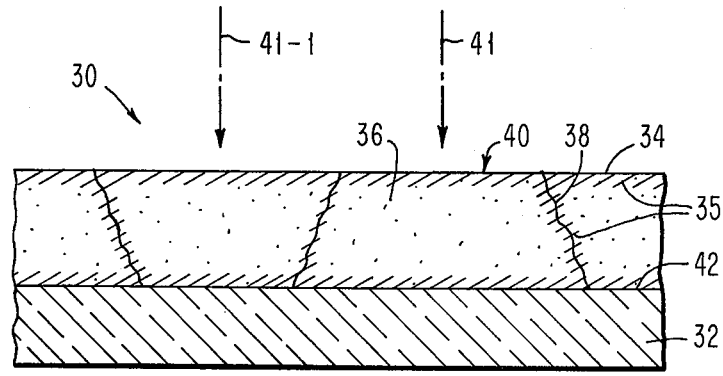
FIG. 2A is a schematic representation of a cross section through a polycrystalline luminescent thin film according to the practice of this invention. The grain boundaries and surfaces have been preferentially selectively doped to produce a high density of majority carriers relative to the center of the grain therein.
Figure 2B:
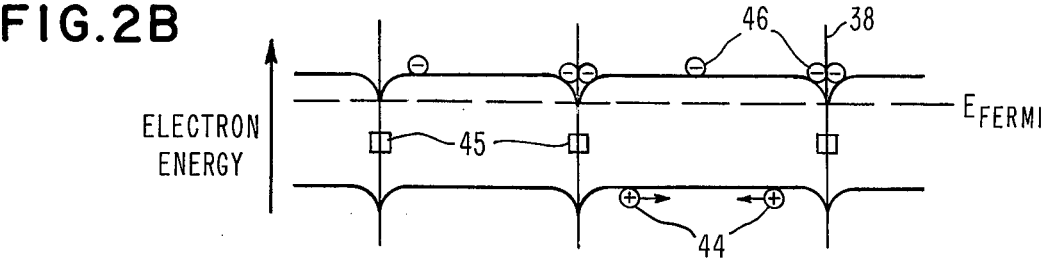
FIG. 2B represents the electron energy diagram along a line through a polycrystalline luminescence thin film by the practice of this invention in which the energy bands have been distorted so to prevent minority carriers from reaching the region in the vicinity of the grain boundary.

The prior art of polycrystalline semiconductor thin film materials is illustrated in FIGS. 1A and 1B. A cross-sectional representation 10 of a luminescent film of the prior art, represented in FIG. 1A, comprises a thin film of polycrystalline semiconductor material 20 on an insulating substrate 12. In general, the film comprises crystallites without any particular orientation, size, or other configuration. Individual grains 16 of the semiconductor material may be bounded by a surface 14, a grain boundary 18, or an interface 22 with the insulating substrate 12. Incident radiation 21 and 21-1 on the polycrystalline semiconductor film 20 generates electron-hole pairs within the individual grains 16 of the film. The minority carrier of the electron-hole pair diffuses within the polycrystalline material until it recombines in either a luminescent or a nonradiative recombination process.

In a typical film, in which the minimum dimension through the volumetric center of the grain (which is called grain size for the purpose of exposition) is much smaller than the diffusion length of the minority carrier (in a single crystal of the semiconductor material), non-radiative recombination at the grain boundaries (where the density of recombination centers 25 is high) dominates the recombination of the minority carriers. The behavior of minority carriers in the luminescent film of the prior art may be understood by reference to FIG. 1B, wherein is represented the electron energy band within the polycrystalline material of FIG. 1A. In order to facilitate this representation, the doping type of the polycrystalline film 20 is arbitrarily chosen to be n-type, so that the majority carriers are electrons 26 and the minority carriers are holes 24.

The electron energy bands of the luminescent polycrystalline thin film of the prior art are shown to be independent of position, although there may be random inhomogeneities in the film and defects in the film and in the grain boundary which cause some variation of the electron energy band. However, the simple representation of constant electron energy as a function of distance in FIG. 1B is ample to understand the prior art. Electrons 26 produced by the incident radiation 21 join the population of majority electrons already in the conduction band of the material. The equal number of holes 24 produced by the incident radiation 21 diffuse within the semiconductor material 16 of the polycrystalline semiconductor, until they recombine with electrons, either by luminescent recombination with electrons or by non-radiative recombination with electrons at crystalline defects. Most of the crystalline defects occur near grain boundaries 18, the semiconductor substrate interface 22, or the semiconductor surface 14. In a typical application, the diffusion length of holes 24 in the bulk semiconductor material is considerably longer than the width of the typical grain 16. Therefore, hole 24 produced by the incident radiation 21 has a high probability of diffusing to the region at the grain surface, bounded by the grain boundaries 18, the grain surface 14 or the grain substrate interface 22, where they recombine nonradiatively. Thus, most of the holes produced by the incident radiation are lost to non-radiative recombination at the grain surfaces, so that they do not emit light by luminescent recombination.

The usual luminescent efficiency of the polycrystalline semiconductor thin films of the prior art has been increased somewhat by recent improvement in the development of the prior art. One improvement involves increasing the probability for radiative recombination within the semiconductor material. The probability for radiative recombination has been increased by the introduction of luminescent recombination centers into the semiconductor material 20; by the choice of material such that it is a direct band gap semiconductor in which luminescent recombination is more probable than in an indirect band gap material; and by fabrication of the polycrystalline film 20 is such a manner that the grain size is as large as is practicable. By each of these three prior art techniques, the luminescent efficiency of the luminescent thin film of the prior art 10 has been increased somewhat, but the efficiency of such semiconductor films is still far below the efficiency of various powder phosphors commonly used in cathode ray tubes and in fluorescent lighting tubes. A disadvantage of the polycrystalline thin film of semiconductor material as developed in the prior art remains in that non-radiative recombination in the region of the grain boundaries dominates the recombination of minority carriers and thereby quenches luminescent efficiency.

CONSIDERATIONS FOR THE INVENTION

Figure 3:
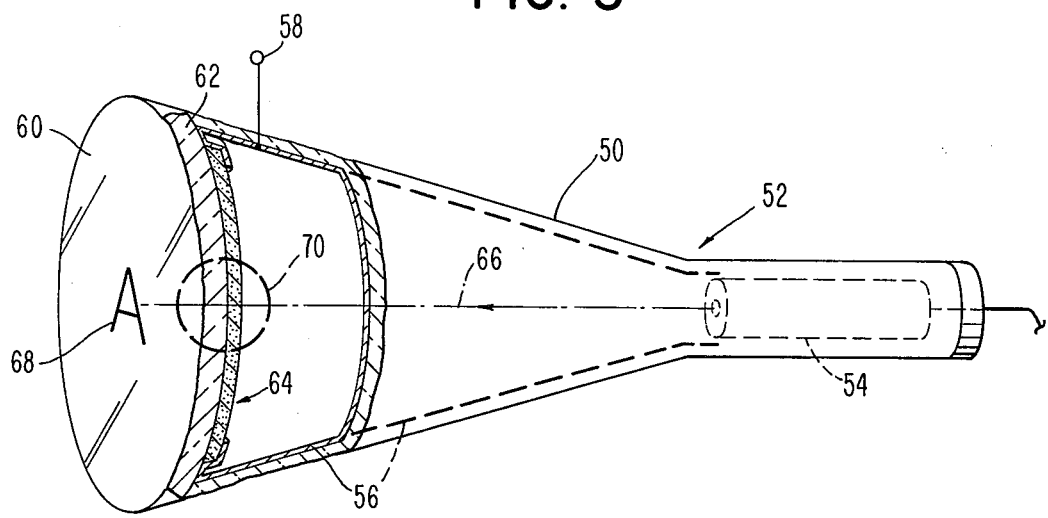
FIG. 3 shows the application of the polycrystalline luminescent thin film according to the practice of this invention for use as a high-resolution, high-efficiency phosphorescent screen in an electron beam tube.

The teachings of this invention are applied to the specific exemplary embodiment of a high-resolution, high-efficiency cathode ray tube (CRT) which is shown schematically in FIG. 3. The polycrystalline luminescent thin film, as taught by the principles of this invention obtains several advantages over the prior art when combined with a high resolution electron gun 54 to form a cathode ray tube. A first advantage is an increased resolution of the CRT system which results from the fact that the luminescent film used as the screen 64 of the CRT is sufficiently conductive to prevent charging of the screen by the incident electron beam 66. The absence of the effects of charging of the screen is an especial advance over the prior art. It obtains a substantial increase in resolution and repeatability of the output from the CRT over the prior art.

A second advantage and advance over the prior art is due to the smaller size of the component grains of the luminescent screen, such smaller size being practicable at a desirable luminescent efficiency by the application of the principles of this invention. A third advantage involves the increased luminescent efficiency of the CRT screen as practiced in this invention.

Figure 4:
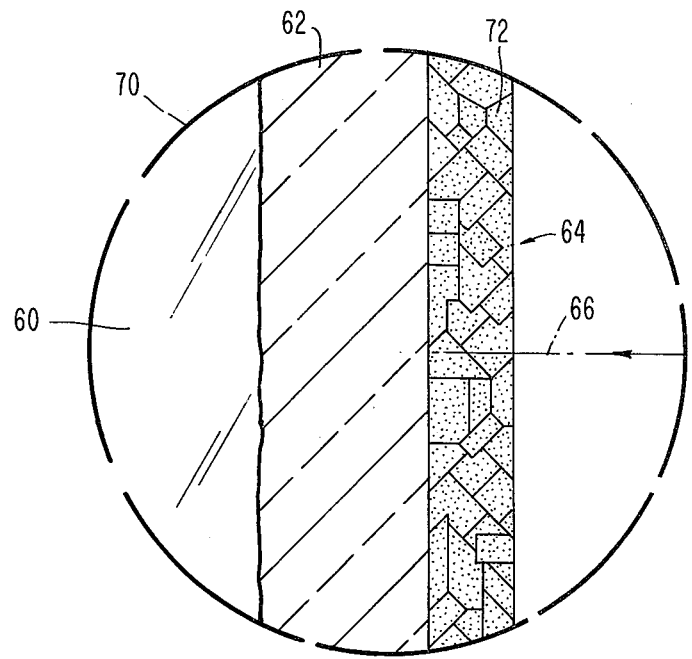
FIG. 4 presents a exemplary embodiment of this invention comprising a high-efficiency, high-resolution luminescent thin film represented in a cross sectional view showing a polycrystalline thin film of gallium phosphide on the glass face plate of an electron beam tube.

The CRT 52 of this invention comprises a high resolution electron gun 54 in a vacuum envelope 50 in accordance with prior art CRT design, and a luminescent screen 64 on the face plate 60 of the CRT. The conductive luminescent screen, as taught by this invention is electrically connected to a conductive graphite coating 56 inside the CRT glass envelope 50. The electron beam 66 excites luminescence 68 in the screen by creating electron-hole pairs within the grains therein. Details of the luminescent screen are shown in the sectional view 70 in FIG. 4. Illustratively, a 20 micron thick film of polycrystalline GaP 72 of n-type, with preferential heavy N-doping in the grain boundary region thereof, is attached to the glass 62 faceplate 60 of the CRT tube.

Figure 5A:
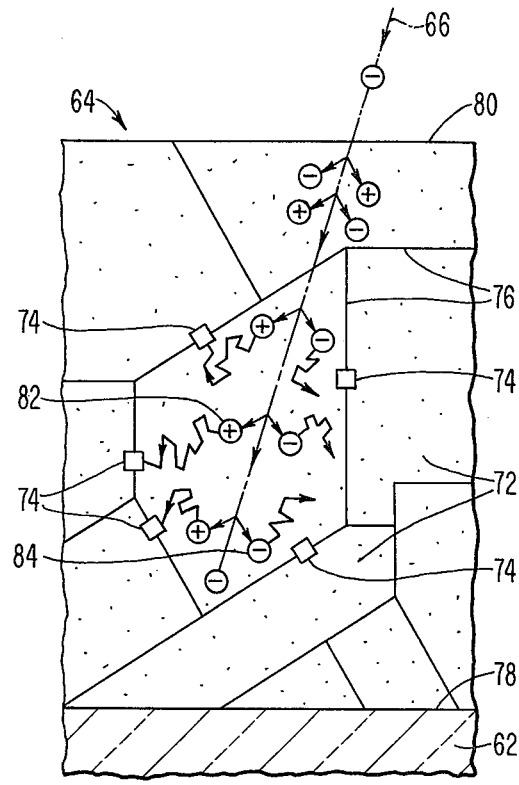
FIG. 5A is a cross sectional representation of the microscopic processes which occur when a thin film used as the phosphorescent screen in an electron beam tube without benefit of the preferential and selective grain boundary doping taught for the practice of this invention.
Figure 5B:
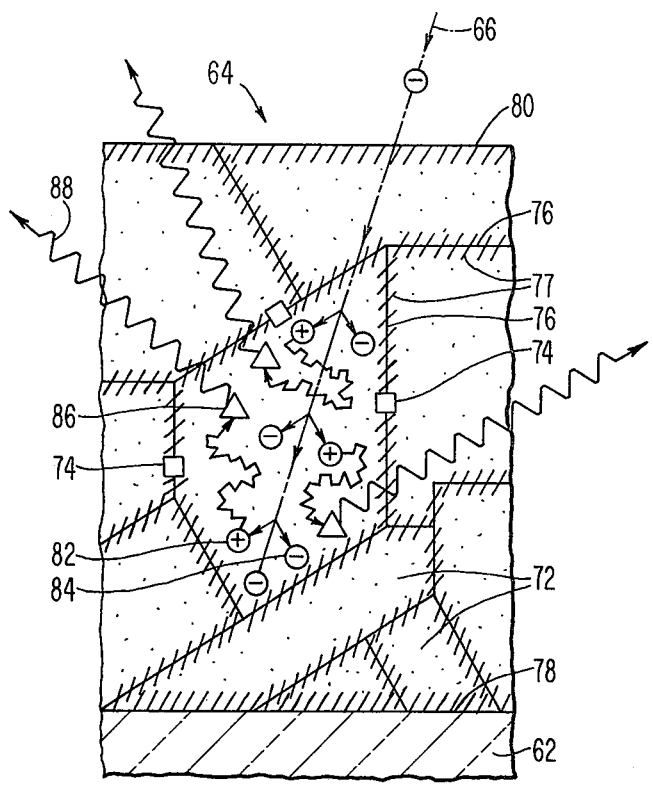
FIG. 5B is a cross section representation of the microscopic processes which occur in an exemplary embodiment of this invention in its use as the phosphorescent screen of an electron beam in which preferential and selective doping of the grain boundary region prevents minority carriers generated by the incident electron beams from reaching the grain boundaries and their associated recombination centers, thus increasing the efficiency of the thin film.

The heavily doped N-type region near the grain boundaries increase the luminous efficiency of the luminous film 64, in accordance with the teachings of this invention, as is illustrated in FIGS. 5A and 5B. FIG. 5A illustrates the operation of the luminescent thin film without benefit of the preferential heavy doping, and FIG. 5B illustrates the improved operation of the luminescent thin film due to the preferential heavy n-type doping in the grain boundary region. In the prior art of FIG. 5A, an energetic electron beam 66 excites electron-hole pairs in the grains 72 of the GaP material. Electrons 84 created in the pairs join the electrons of the majority carriers in the grain. Holes 82 produced in the pairs diffuse randomly within the grain until they recombine.

In comparison to the novel advantages which derive from the practice of this invention, since the minority carrier or hole diffusion length in GaP is longer than the 1 to 4 micron grain size in the film 64, most of the holes would be lost to non-radiative recombination in recombination centers 74 at the grain boundaries 76, at the semiconductor-insulator interface 78, or at the film surface 80 for a low luminescent output of a film according to the prior art.

One aspect of the advantages of the present invention is illustrated in FIG. 5B, showing the luminescent response of the novel GaP film 64 provided by this invention to an incident electron energetic beam 66. Electron-hole pairs are produced by the beam within the grains 72 of the GaP material. Electrons 84 are absorbed into the population of majority carriers. Holes 82 produced by the electron beam 66 diffuse within the central portion of the grain in which they were created; the equipotential lines within each grain, produced by the heavy doping 77 near each grain boundary 76, surface 80, or substrate interface 78, constrains the hole to move within the central portion of the grain. The holes cannot normally reach the grain boundaries, where the density of recombination centers is very high. As a result, the holes recombine preferentially in a luminescent recombination event 86 to produce a photon of light 88 output.

Figure 6A:
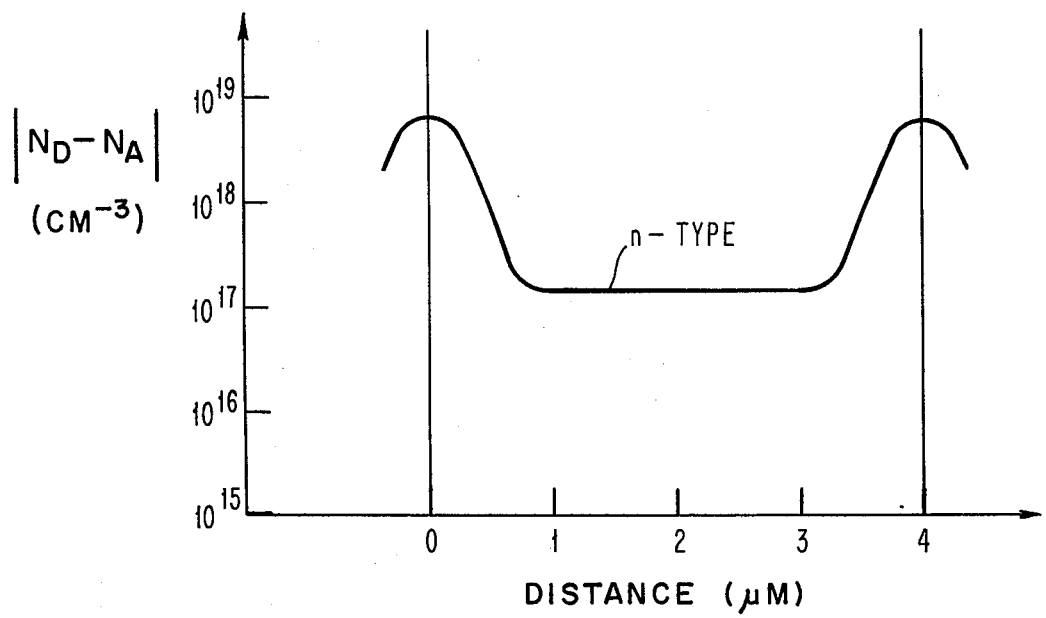
FIG. 6A shows the net doping density in an exemplary embodiment with a gallium phosphide luminescent thin film as a function of distance away from one of the grain boundaries.
Figure 6B:
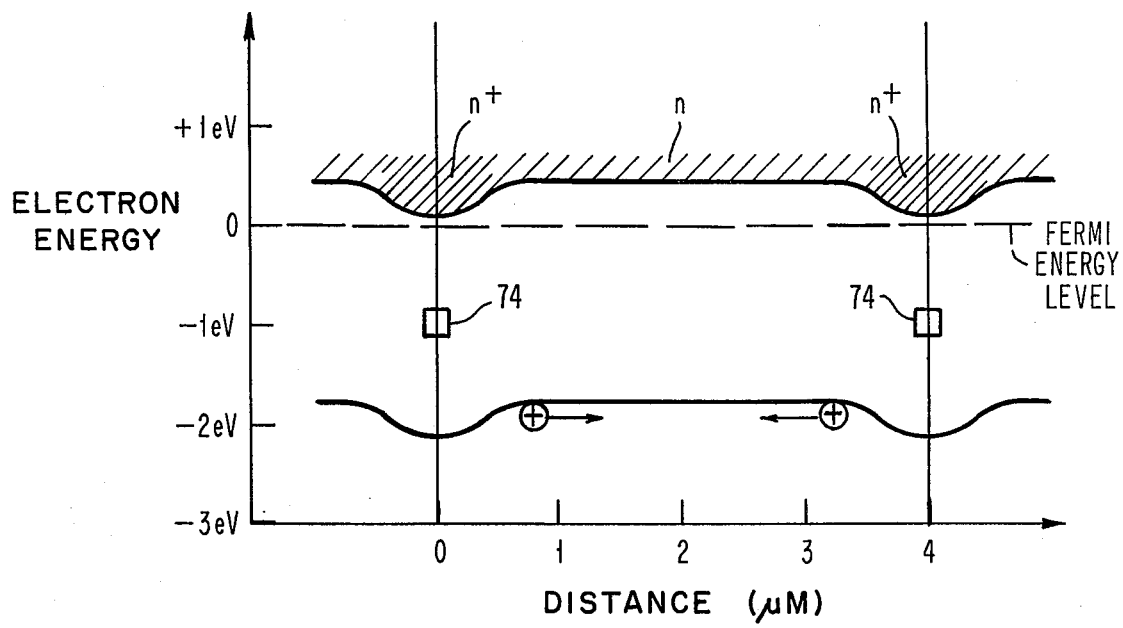
FIG. 6B shows the electron energy band in the gallium phosphide exemplary embodiment luminescent thin film as a function of distance from one of the grain boundaries.

Details of the operation of the invention can be desirably understood in the application to the polycrystalline GaP luminescent CRT screen, by reference to the FIGS. 6A and 6B. FIG. 6A represents the approximate doping density in a cross-section through a typical grain of the especially doped GaP material. The electron density in the central portion of the grain is about $1-2 \times 10^{12}/cm^3$, while the electron density is about $5-7 \times 10^{18}/cm^3$ in the immediate vicinity of the grain boundary. The dopant within the grains comprises an essentially uniform background distribution of tellurium dopant, with a sulphur dopant of high concentration preferentially near the grain boundary. As a result of the high majority doping level near the grain boundaries, the electron energy bands within each grain are distorted in a way which is illustrated in FIG. 6B. An excess potential of about 0.2 electron volts near the grain boundary repels holes from the region near the grain boundary. As a direct result, holes cannot recombine at the recombination centers 79 at the grain boundaries.

I claim:

1. A polycrystalline semiconductor material comprising individual grains each one of which contains an impurity or impurities arranged especially such that they dope the grain to provide majority carriers of a given density distribution, said grain of semiconductor material containing dopant producing charge carriers of substantially one conductivity type, and said density of majority carriers being substantially higher in the immediate, finite region near the grain surface than in the region near the center of the grain, and said grains being of average size smaller than the minority carrier diffusion length in bulk semiconductor material of the same type and doping density as the material in the center of the grain.

2. Material as set forth in claim 1, in which the grain size is between about 1 and 100 microns in average cross section dimension.

3. Material as set forth in claim 1, in which the doping majority carrier density in the region of the grain boundaries is more than one order of magnitude larger than the majority carrier density in the region of the grain center.

4. Material as set forth in claim 1, in which each grain is physically separate from the other grains thereof, the material comprising essentially a powder of individual grains.

5. Material as set forth in claim 1, wherein said grains are aggregated into a film with a relatively high luminescent efficiency when excited by ionizing radiation.

6. Luminescent film as set forth in claim 5, wherein said grains are arranged contiguously to comprise a polycrystalline thin film, such that the grains are bounded either by an adjacent grain of approximately the same physical characteristics, or by the top or bottom surface of said film so that said film is electrically conductive.

7. Luminescent polycrystalline thin film comprising contiguous grains as set forth in claim 6, in which said grains comprise a material chosen from the group consisting of GaAs, GaP, AlAs, InP, AlN, and GaN, or from the group comprising alloys of any two of the materials of said group.

8. Luminescent film as set forth in claim 5, wherein said grains are arranged non-contiguously in such a way that each grain contacts the grains adjacent to itself by a small portion of the grain surface, said grains comprising a loose aggregate bound together by an inactive agent to form a mechanically and chemically stable film.

9. Luminescent film as set forth in claim 8 in which said grains comprise a material chosen from the group consisting of CdS, ZnO, ZnS, GaN, and AlN.

10. Material as set forth in claim 1, in which said semiconductor material comprises a material with a direct band gap, said material being chosen from the class including the direct band gap III-V and II-VI materials and alloys thereof.

11. Semiconductor material as set forth in claim 10 in which said III-V materials are GaP, AlN, $Ga_xAl_{1-x}As$ and the II-VI materials are CdS and ZnS.

12. Semiconductor material as set forth in claim 11, in which the semiconductor material is N-type doped $Ga_xAl_{1-x}As$, the grain size thereof being in the range from about 1 to about 10 microns, the doping density for the central portion thereof being approximately $10^{17}/cm^3$, and the doping density for the region near the grain boundary thereof being approximately $10^{19}/cm^3$, and the impurity dopant thereof being chosen from the group consisting of S, Se, and Te.

13. Semiconductor material as set forth in claim 11 in which said semiconductor material is GaP of substantially n-type conductivity,
said grain size being in the range from about one to about 10 microns,
said especial doping density profile comprising:
a uniform background density of sulfur at a density of about $10^{16}$ atoms/cm$^3$; and
an additional amount of sulfur doping density reaching a maximum density of abount $10^{18}$ atoms/cm$^3$; and
said polycrystalline film having a thickness of between one micron and 20 microns.

14. An electron beam display device in which the luminescent screen thereof comprises;
a polycrystalline semiconductor,
said semiconductor comprising grains which are especially doped such that the doping density in the surface region of each grain is at least one order of magnitude greater than and of the same conductivity type as the doping density in the center of each grain,
said semiconductor is of the direct bandgap type, and the average size of said grains is in the range from 0.5 micron to 20 microns.

15. A display device set forth in claim 14 in which the device is a cathode ray tube.

16. A cathode ray tube as set forth in claim 15 in whch said semiconducting film is substantially conductive.

17. A cathode ray tube as set forth in claim 16 in which said semiconductor is GaP and the doping impurity is selected from the group consisting of S, Se and Te.

18. Display device as set forth in claim 14 wherein said luminescent polycrystalline thin film comprise contiguous grains in which said grains comprise a semiconductor material chosen from the group consisting of GaAs, GaP, AlAs, InP, AlN, and GaN.

19. Display device as set forth in claim 18 wherein said grains comprise alloys of any two of the materials of said group.

20. Display device as set forth in claim 19, wherein said grains are arranged non-contiguously in such a way that each grain contacts the grains adjacent to itself by a small portion of the grain surface, said grains comprising a loose aggregate bound together by an inactive agent to form a mechanically and chemically stable film.

21. Display device as set forth in claim 20, wherein said grains are arranged contiguously to comprise a polycrystalline thin film, such that the grains are bounded either by an adjacent grain of approximately the same physical characteristics, or by the top or bottom surface of said film so that said film is electrically conductive.

22. Display device as set forth in claim 21, in which the semiconductor material is N-type doped Ga$_x$Al$_{1-x}$As,
the grain size thereof being in the range from about 1 to about 10 microns,
the doping density for the central portion thereof being approximately $10^{17}$/cm$^3$, and the doping density for the region near the grain boundary thereof being approximately $10^{19}$/cm$^3$, and
the impurity dopant thereof being chosen from the group consisting of S, Se, and Te.

23. Display device as set forth in claim 22 in which said semiconductor material is GaP of substantially n-type conductivity,
said grain size being in the range from about one to about 10 microns,
said especial doping density profile comprising:
a uniform background density of sulfur at a density of about $10^{16}$ atoms/cm$^3$; and
an additional amount of sulfur doping density reaching a maximum density of abount $10^{18}$ atoms/cm$^3$; and
said polycrystalline film having a thickness of between one microns and 20 microns.

24. Method of fabricating a polycrystalline film with a high luminous efficiency which comprises the step of:
preferentially and heavily doping the region of material near the surface of each grain with a dopant of the same conductivity type as that of the substantial body of the grain.

25. Method as set forth in claim 24 in which said step for preferentially doping said regions near the grain boundary includes:
a first low temperature diffusion of doping material into the grain boundaries of said film, and
a second high temperature annealing of the film in which the grain boundaries have been doped.

26. Method of preferentially doping polycrystalline semiconductor material as set forth in claim 25, in which:
said low temperature diffusing is accomplished at a temperature approximately between 100° C and 400° C, and
said high temperature diffusing accomplished at a temperature approximately between 800° C and 1200° C.

27. Method of preferentially doping a semiconductor thin film as put forth in claim 26, in which said preferential doping of the region near the grain boundary is accomplished by:
diffusing the dopant into the film at a sufficiently low temperature that grain boundary diffusion is dominant, and
annealing said film at a temperature above that at which grain boundary diffusion is substantially dominant.

28. Method of fabricating a multi-grain layer of semiconductor material on an insulating substrate by the steps comprising:
forming the grains of said material by deposition by a procedure selected from the group consisting of chemical vapor deposition, sputtering, vacuum evaporation, or grinding of the bulk material in which
said material contains a low level of dopant material, and
including a processing step of diffusing a large amount of dopant into the surface of each grain where said dopant is of the same type as the dopant of the body of the grain.

29. Method of claim 28 wherein said semiconductor comprises direct band gap material.

30. Method of fabricating a multi-grain layer of semiconductor material of high luminous efficiency on an insulating substrate by the steps comprising:
forming the grains of said material by deposition by a procedure selected from the group consisting of chemical vapor deposition, sputtering, vacuum evaporation, or grinding of the bulk material in which said material contains a low level of dopant material, and including preferentially and heavily doping the region of material near the surface of each grain with a dopant of the same conductivity type as that of the substantial body of the grain by a processing step of diffusing a large amount of dopant into the surface of each grain where said dopant is of the same type as the dopant of the body of the grain.

31. Method of fabricating a multi-grain layer of semiconductor material of high luminous efficiency on an insulating substrate by the steps comprising:

forming the grains of said material by deposition by a procedure selected from the group consisting of chemical vapor deposition, sputtering, vacuum evaporation, or grinding of the bulk material in which said material contains a low level of dopant material, and including a processing step for preferentially doping said grains near said surface of each grain by diffusing a large amount of dopant into the surface of each grain where said dopant is of the same type as the dopant of the body of the grain including a first low temperature diffusion of doping material into said surfaces of said grains, and a second high temperature annealing of said layer in which said surfaces have been doped.

32. Method of fabricating said multi-grain layer as a polycrystalline film as set forth in claim 31 in which said preferential doping of the region near the grain boundary is accomplished by:

diffusing the dopant into the film at a sufficiently low temperature that grain boundary diffusion is dominant, and annealing said film at a temperature above that at which grain boundary diffusion is substantially dominant.

* * * * *